(12) United States Patent
Kim

(10) Patent No.: US 11,841,329 B2
(45) Date of Patent: Dec. 12, 2023

(54) OBJECT DAMAGE INSPECTING DEVICE AND INSPECTING METHOD USING THE SAME

(71) Applicant: PUKYONG NATIONAL UNIVERSITY INDUSTRY-UNIVERSITY COOPERATION FOUNDATION, Busan (KR)

(72) Inventor: Chan Jung Kim, Busan (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 0 days.

(21) Appl. No.: 16/839,627

(22) Filed: Apr. 3, 2020

(65) Prior Publication Data

US 2021/0293726 A1    Sep. 23, 2021

(30) Foreign Application Priority Data

Mar. 19, 2020    (KR) .......................... 10-2020-0033665

(51) Int. Cl.
*G01H 1/00*    (2006.01)
*G01H 1/06*    (2006.01)
(Continued)

(52) U.S. Cl.
CPC .......... *G01N 21/9009* (2013.01); *G01H 1/00* (2013.01); *G01H 1/006* (2013.01); *G01H 1/06* (2013.01); *G01N 21/956* (2013.01)

(58) Field of Classification Search
None
See application file for complete search history.

(56) References Cited

U.S. PATENT DOCUMENTS 6,450,035 B1 * 9/2002 Nishizono ............ G01N 29/045
73/1.82
8,280,648 B2 * 10/2012 Larose ............... G01N 29/4436
702/39
(Continued)

FOREIGN PATENT DOCUMENTS

| KR | 101796753 | 11/2017 |
| KR | 20190037912 | 4/2019 |
| KR | 20190065723 | 6/2019 |

OTHER PUBLICATIONS

Espacenet, Sprik, "Method and System for Non-destructive Testing," Sep. 13, 2012, WIPO, WO2012/121599 A1 (Year: 2012).*

(Continued)

*Primary Examiner* — Michael J Dalbo
*Assistant Examiner* — Denise R Karavias
(74) *Attorney, Agent, or Firm* — NORTON ROSE FULBRIGHT US LLP

(57) ABSTRACT

Disclosed are an object damage inspection system and an object damage inspection method using the same. The system includes a vibration exciter for setting a vibration exciting pattern and applying a physical force to one face of the fixed test object based on the set vibration exciting pattern; a sensor contacting a portion of the test object, wherein the sensor collects a vibration signal generated from the test object when the physical force is applied thereto; and a damage determiner configured to determine whether the test object has physical damage, based on a test object measurement frequency signal and a reference object measurement frequency signal, wherein the test object measurement frequency signal includes a frequency domain signal into which the vibration signal collected by the sensor is converted.

13 Claims, 9 Drawing Sheets

(51) Int. Cl.
*G01N 21/90* (2006.01)
*G01N 21/956* (2006.01)

(56) References Cited

U.S. PATENT DOCUMENTS

| | | | |
|---|---|---|---|
| 2009/0010456 A1* | 1/2009 | Goldstein | H04R 25/02 |
| | | | 381/56 |
| 2011/0231112 A1* | 9/2011 | Soejima | G01N 29/4436 |
| | | | 702/35 |
| 2016/0167201 A1* | 6/2016 | Saraie | B25B 1/2405 |
| | | | 29/559 |
| 2017/0097280 A1* | 4/2017 | Drescher | G01B 7/14 |
| 2017/0138906 A1* | 5/2017 | Hartwig | G01N 29/4427 |
| 2018/0036848 A1* | 2/2018 | Stockburger | B23Q 1/25 |
| 2019/0346408 A1* | 11/2019 | Lanza di Scalea | G01N 29/04 |
| 2021/0131930 A1* | 5/2021 | Kinoshita | G05D 19/02 |

OTHER PUBLICATIONS

Digi-Key Electronics, Langley Research Center, Hampton, Virginia, "Macro-Fiber Composite (MFC) Actuator," Downloaded Sep. 7, 2021, downloaded from https://www.techbriefs.com/component/content/article/tb/pub/techbriefs/mechanics-and-machinery/35724 (Year: 2019).*

* cited by examiner

[FIG. 6]
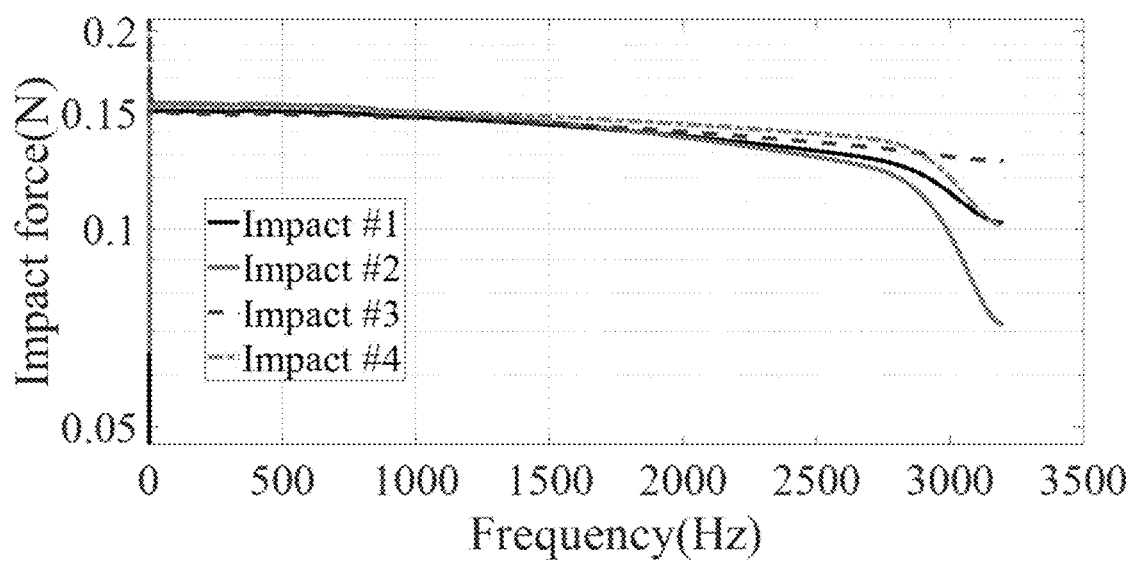

[FIG. 7]
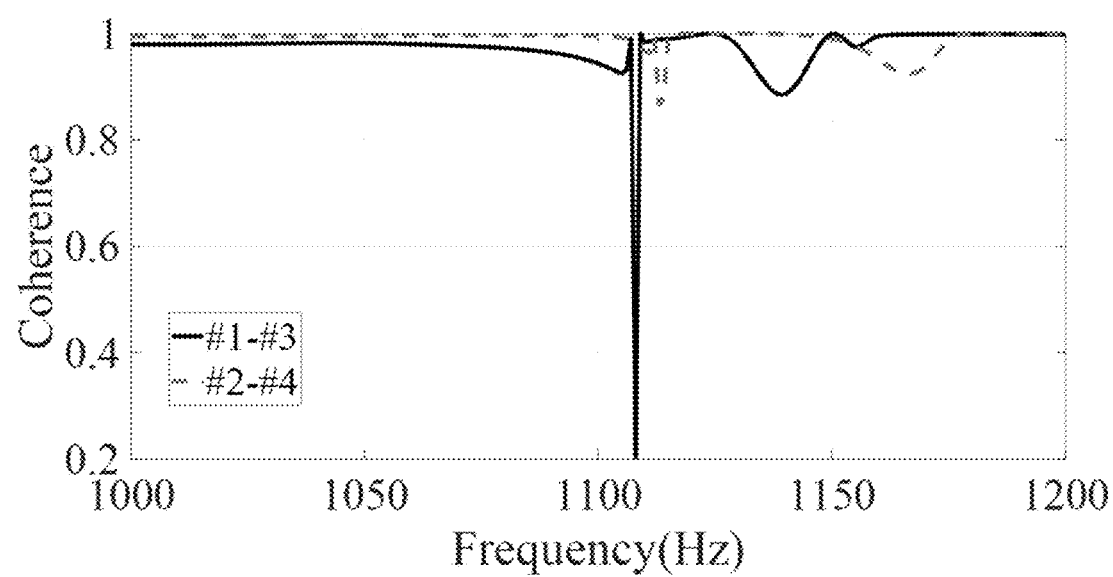

[FIG. 8]
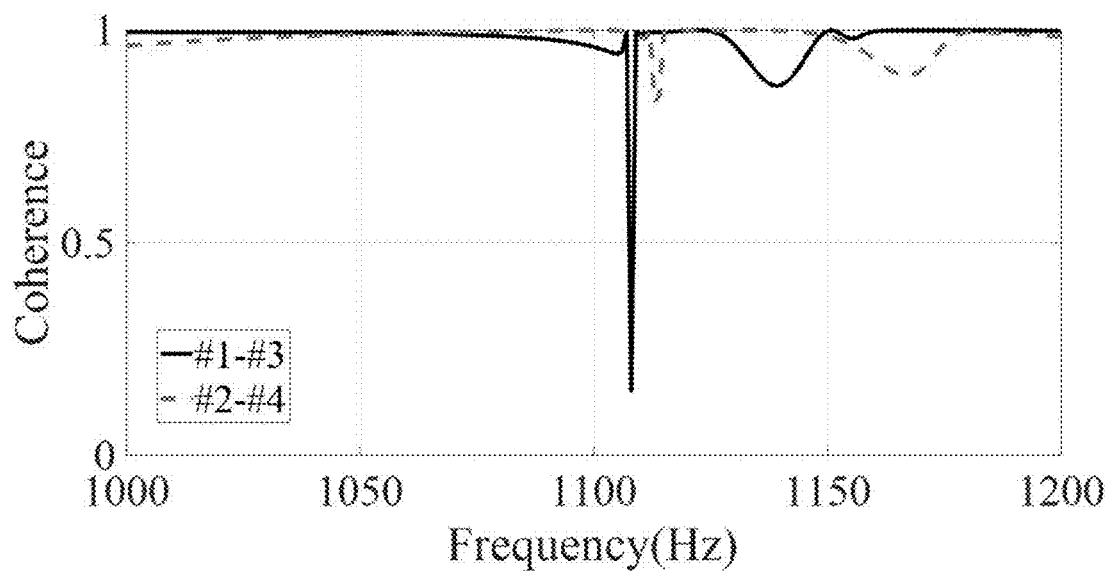

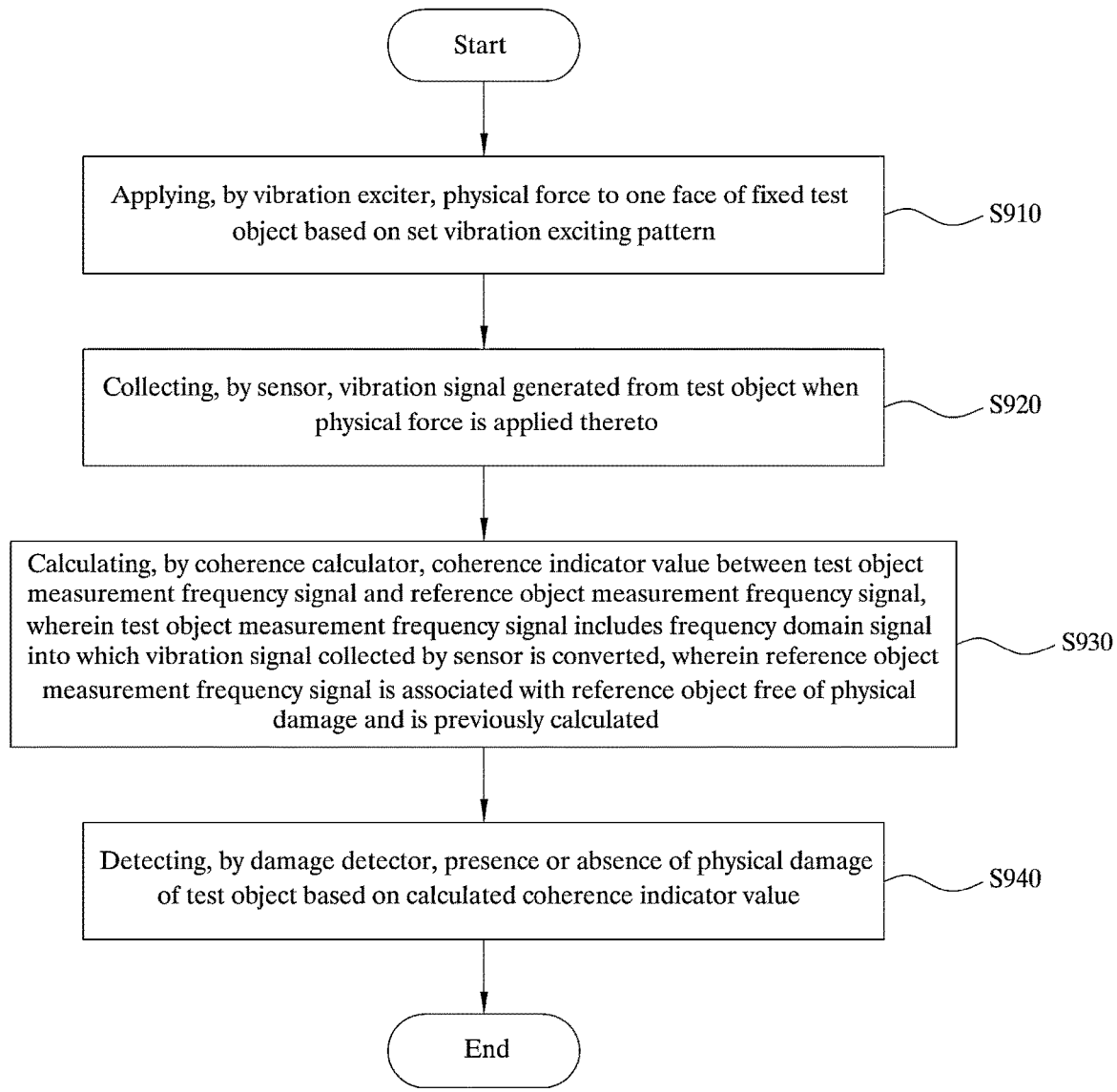

OBJECT DAMAGE INSPECTING DEVICE AND INSPECTING METHOD USING THE SAME

CROSS-REFERENCE TO RELATED APPLICATION

This application claims a benefit under 35 U.S.C. § 119(a) of Korean Patent Application No. 10-2020-0033665 filed on Mar. 19, 2020, with the Korean Intellectual Property Office, the entire disclosure of which is incorporated herein by reference for all purposes.

BACKGROUND

1. Field

The present disclosure relates to an object damage inspection system and an object damage inspection method using the same. More specifically, the present disclosure relates to an object damage inspection system and an object damage inspection method using the same, in which inspection is performed using only an output value measured from an inspection target object, thereby to more easily construct the inspection system.

2. Description of Related Art

Frequency response refers to a measurement of an output signal output from a system in a frequency domain when an input signal of various frequencies and a constant amplitude is input to the system.

A frequency response function refers to an expression that indicates correlation between the input signal and the output signal in a specific system, and is used as an important physical indicator that may be used to analyze physical characteristics of the system. For example, in a non-destructive inspection system, measuring and analyzing the frequency response function of an object may allow physical properties of the object to be analyzed without destroying the object. Therefore, measuring an accurate frequency response function is very important to obtain prior information for securing mechanical reliability of a target object.

However, a conventional inspection system using the frequency response function should measure both the input signal and the output signal to calculate the frequency response function of the object, and convert both the signals into frequency domain signals respectively. Thus, a configuration of the inspection system must be complicated.

A related prior art includes Patent Document 1: Korea Patent Application Publication No. 10-2019-0065723 (2019 Jun. 12), pages 6 to 10.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

A purpose of the present disclosure is to provide an object damage inspection system and an object damage inspection method using the inspection system that inspection is executed using only an output value measured from an inspection target object, thereby to more easily construct the inspection system.

Another purpose of the present disclosure is to provide an object damage inspection system and an object damage inspection method using the same, in which a damage location may be analyzed along with physical damage presence or absence of an inspection target object.

Still another purpose of the present disclosure is to provide an object damage inspection system and an object damage inspection method using the same, in which a cost of the inspection system is lowered and maintenance of the inspection system is simplified via simplifying of a configuration of the inspection system.

Purposes in accordance with the present disclosure are not limited to the above-mentioned purpose. Other purposes and advantages in accordance with the present disclosure as not mentioned above may be understood from following descriptions and more clearly understood from embodiments in accordance with the present disclosure. Further, it will be readily appreciated that the purposes and advantages in accordance with the present disclosure may be realized by features and combinations thereof as disclosed in the claims.

A first aspect of the present disclosure provides an object damage inspection system comprising: a fixture to fix a test object; a vibration exciter for setting a vibration exciting pattern and applying a physical force to one face of the fixed test object based on the set vibration exciting pattern; a sensor contacting a portion of the test object, wherein the sensor collects a vibration signal generated from the test object when the physical force is applied thereto; and a damage determiner configured to determine whether the test object has physical damage, based on a test object measurement frequency signal and a reference object measurement frequency signal, wherein the test object measurement frequency signal includes a frequency domain signal into which the vibration signal collected by the sensor is converted, wherein the reference object measurement frequency signal is associated with a reference object free of physical damage and is previously calculated, wherein the damage determiner includes: a coherence calculator for calculating a coherence indicator value between the test object measurement frequency signal and the reference object measurement frequency signal; and a damage detector for detecting presence or absence of the physical damage of the test object based on the calculated coherence indicator value.

In one implementation of the first aspect, the fixture includes a fixing jig, wherein the fixing jig fixes one end of the test object.

In one implementation of the first aspect, the sensor includes an acceleration sensor to measure acceleration vibration.

In one implementation of the first aspect, the sensor includes a plurality of sensors, wherein the plurality of sensors are spaced apart from each other and are arranged at a plurality of locations of the test object respectively.

In one implementation of the first aspect, wherein each of the sensors is disposed at each of faces of the test object.

In one implementation of the first aspect, the coherence calculator is configured to calculate the coherence indicator value based on a following Equation 1:

$$I(\omega) = \frac{|G_{R(\omega)\tilde{R}(\omega)}|^2}{G_{R(\omega)R(\omega)} G_{\tilde{R}(\omega)\tilde{R}(\omega)}} \quad \text{[Equation 1]}$$

where I(w) represents a coherence indicator, w represents an angular frequency=$2\pi f$, $G_{R(\omega)R(\omega)}$ represents an auto correlation value of the reference object measurement frequency signal, $G_{\tilde{R}(\omega)\tilde{R}(\omega)}$ represents an auto correlation value of the test object measurement frequency signal, $G_{R(\omega)\tilde{R}(\omega)}$ represents a cross correlation value between the test object measurement frequency signal and the reference object measurement frequency signal, R(w) represent the reference object measurement frequency signal, and $\tilde{R}(\omega)$ represents the test object measurement frequency signal.

In one implementation of the first aspect, the damage detector is configured to compare the calculated coherence indicator value with a preset value and to detect the presence or absence of the physical damage of the test object based on the comparison result.

In one implementation of the first aspect, the coherence calculator is configured to calculate each coherence indicator corresponding to each of n signals measured by each of n sensors, based on each of n test object measurement frequency signals as calculated based on each of the n signals, and the reference object measurement frequency signal.

In one implementation of the first aspect, the damage detector is configured to compare each coherence indicator value corresponding to each signal measured by each sensor with a preset value, and to detect the presence or absence of the physical damage and a damage occurrence position of the test object, based on the comparison result.

A second aspect of the present disclosure provides an object damage inspection method comprising: fixing a test object using a fixture; setting, by a vibration exciter, a vibration exciting pattern; applying, by the vibration exciter, a physical force to one face of the fixed test object based on the set vibration exciting pattern; collecting, by a sensor, a vibration signal generated from the test object when the physical force is applied thereto; calculating, by a coherence calculator, a coherence indicator value between a test object measurement frequency signal and a reference object measurement frequency signal, wherein the test object measurement frequency signal includes a frequency domain signal into which the vibration signal collected by the sensor is converted, wherein the reference object measurement frequency signal is associated with a reference object free of physical damage and is previously calculated; and detecting, by a damage detector, presence or absence of the physical damage of the test object based on the calculated coherence indicator value.

In one implementation of the second aspect, calculating the coherence indicator value includes calculating the coherence indicator value based on a following Equation 1:

$$I(\omega) = \frac{|G_{R(\omega)\tilde{R}(\omega)}|^2}{G_{R(\omega)R(\omega)} G_{\tilde{R}(\omega)\tilde{R}(\omega)}}$$ [Equation 1]

where I(w) represents a coherence indicator, w represents an angular frequency=$2\pi f$, $G_{R(\omega)R(\omega)}$ represents an auto correlation value of the reference object measurement frequency signal, $G_{\tilde{R}(\omega)\tilde{R}(\omega)}$ represents an auto correlation value of the test object measurement frequency signal, $G_{R(\omega)\tilde{R}(\omega)}$ represents a cross correlation value between the test object measurement frequency signal and the reference object measurement frequency signal, R(w) represent the reference object measurement frequency signal, and $\tilde{R}(\omega)$ represents the test object measurement frequency signal.

In one implementation of the second aspect, detecting the presence or absence of the physical damage includes comparing the calculated coherence indicator value with a preset value, and detecting the presence or absence of the physical damage of the test object based on the comparison result.

In one implementation of the second aspect, calculating the coherence indicator value includes calculating each coherence indicator corresponding to each of n signals measured by each of n sensors, based on each of n test object measurement frequency signals as calculated based on each of the n signals, and the reference object measurement frequency signal.

In one implementation of the second aspect, detecting the presence or absence of the physical damage includes comparing each coherence indicator value corresponding to each signal measured by each sensor with a preset value, and detecting the presence or absence of the physical damage and a damage occurrence position of the test object, based on the comparison result.

Effects in accordance with the present disclosure may be as follows but may not be limited thereto.

The present disclosure may provide an object damage inspection system and an object damage inspection method using the inspection system that inspection is executed using only an output value measured from an inspection target object, thereby to more easily construct the inspection system.

The present disclosure may provide an object damage inspection system and an object damage inspection method using the same, in which a damage location may be analyzed along with physical damage presence or absence of an inspection target object.

The present disclosure may provide an object damage inspection system and an object damage inspection method using the same, in which a cost of the inspection system is lowered and maintenance of the inspection system is simplified via simplifying of a configuration of the inspection system.

In addition to the effects as described above, specific effects in accordance with the present disclosure will be described together with the detailed description for carrying out the disclosure.

BRIEF DESCRIPTION OF DRAWINGS

FIG. 6 shows a frequency component of an input signal input to a test object.

FIG. 7 shows a coherence indicator value calculated using a frequency response function for a test object.

FIG. 8 shows a coherence indicator value calculated using a test object measurement frequency signal for a test object.

FIG. 9 is a flow diagram illustrating an object damage method according to an embodiment of the present disclosure.

DETAILED DESCRIPTIONS

Figure 1:
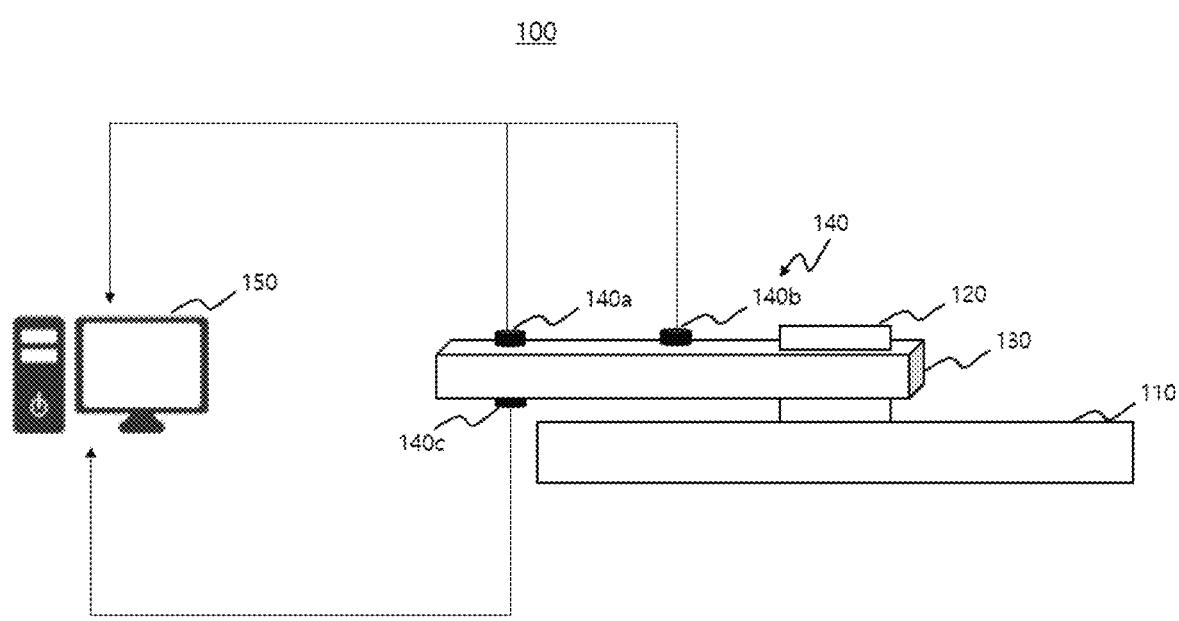
FIG. 1 is a block diagram showing a configuration of an object damage inspection system according to an embodiment of the present disclosure.

For simplicity and clarity of illustration, elements in the figures are not necessarily drawn to scale. The same reference numbers in different figures represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, descriptions of specific details of an object damage inspection system and an object damage inspection method using the same according to the present disclosure will be set forth.

FIG. 1 is a configuration diagram showing a configuration of an object damage inspection system according to an embodiment of the present disclosure.

Referring to FIG. 1, an object damage inspection system 100 may include a vibration exciter 110, a fixture 120, a test object 130, a sensor 140, and a damage determiner 150.

The object damage inspection system 100 inspects physical damage presence or absence of the test object 130 using only an output value measured from the test object. For example, when a vibration exciting signal is input to the test object 130 via the vibration exciter 110, the object damage inspection system 100 collects a vibration signal of the test object 130 using the sensor 140. The object damage inspection system 100 does not use the vibration exciting signal input to the test object 130 via the vibration exciter 110, but uses only the vibration signal collected using the sensor 140, thereby to examine physical damage presence or absence of the test object 130. In one embodiment, the object damage inspection system 100 may correspond to a micro crack inspection system capable of inspecting presence or absence of a micro crack in the test object 130.

Hereinafter, for convenience of descriptions, the descriptions will be set forth on assumption that the object damage inspection system 100 is a micro crack inspection system that inspects micro crack presence or absence of the test object 130 among various physical damages.

The vibration exciter 110 sets a vibration exciting pattern based on data from the damage determiner 150 or under control of a controller and applies a physical force to one face of the test object 130 based on the set vibration exciting pattern. In one embodiment, the vibration exciter 110 may include an impact hammer or an electrodynamic shaker. The impact hammer does not cause physical damage to the test object 130, does not require pre-processing for testing, and may apply an impact to the test object 130 over a wide frequency. The impact hammer may have a tip at an impact part where vibration is actually excited. The tip may be replaced depending on a frequency band required for a test.

The fixture 120 holds the test object 130. In one embodiment, the fixture 120 includes a fixing jig. The fixing jig fixes one end of the test object 130.

The sensor 140 touches a portion of the test object 130. A vibration signal generated from the test object 130 when the physical force from the vibration exciter 110 is applied thereto may be collected by the sensor 140. In one embodiment, the sensor 140 includes an acceleration sensor that measures acceleration vibration.

In one embodiment, a plurality of sensors 140a, 140b, 140c, . . . , 140n may be spaced apart from each other and may be positioned at a plurality of locations on the test object 130 respectively. For example, at least two sensors 140 may be spaced apart from each other and may be disposed on each face of the test object 130. When using multiple sensors, the physical damage presence or absence of the test object 130 (for example, micro crack presence or absence thereof) along with a damage location (e.g., a location where the micro crack occurs) may be analyzed by the object damage inspection system 100.

The damage determiner 150 detects the physical damage presence or absence of the test object 130 based on a test object measurement frequency signal as a frequency domain signal into which the vibration signal collected by the sensor 140 is converted, and based on a previously calculated reference object measurement frequency signal of a reference object. In one embodiment, the reference object refer to a physical damage-free object of the same type as the test object. The reference object measurement frequency signal refers to a frequency domain signal into which a vibration signal measured in the reference object is converted.

In order to obtain the test object measurement frequency signal and the reference object measurement frequency signal, the same vibration exciting signal as the input signal may be applied to the test and reference objects. In one embodiment, the damage determiner 150 includes a memory (not shown). The reference object measurement frequency signal of the reference object may be pre-stored in the memory. The damage determiner 150 may receive a reference object measurement frequency signal as pre-calculated under control of the user and may store the signal in the memory. Alternatively, a reference object measurement frequency signal may be obtained by vibration-exciting the reference object in a reference object measurement mode and then may be stored in the memory.

The damage determiner 150 may include a coherence calculator (not shown) that calculates a coherence value between the test object measurement frequency signal and the reference object measurement frequency signal, and a damage detector (not shown) to detect physical damage presence or absence of the test object 130 based on the calculated coherence value. The coherence calculator calculates the coherence indicator value of the test object 130 using an auto correlation value of the test object measurement frequency signal, an auto correlation value of the reference object measurement frequency signal, and a cross correlation value between the test object measurement frequency signal and the reference object measurement frequency signal.

In one embodiment, the coherence calculator may calculate the coherence indicator value based on a following Equation 1:

$$I(\omega) = \frac{|G_{R(\omega)\bar{R}(\omega)}|^2}{G_{R(\omega)R(\omega)} G_{\bar{R}(\omega)\bar{R}(\omega)}} \quad \text{[Equation 1]}$$

where I(w) represents a coherence indicator, w represents an angular frequency=$2\pi f$, $G_{R(\omega)R(\omega)}$ represents an auto correlation value of a reference object measurement frequency signal, $G_{\bar{R}(\omega)\bar{R}(\omega)}$ represents an auto correlation value of a test object measurement frequency signal, $G_{R(\omega)\bar{R}(\omega)}$ represents a cross correlation value between a test object measurement frequency signal and a reference object measurement frequency signal, R(w) represent a reference object measurement frequency signal, $\bar{R}(\omega)$ and represents a test object measurement frequency signal.

The correlation value may be calculated based on a following Equation 2:

$$G_{R(\omega)R(\omega)} = \int_{-\infty}^{\infty} R(w)R(w+\tau)dw \quad \text{[Equation 2]}$$

The damage detector detects the physical damage presence or absence of the test object 130 based on a comparison result between the coherence indicator value calculated by the coherence calculator and a preset value. For example, the damage detector compares the coherence indicator value calculated at each frequency with a preset value. Then, when the coherence indicator value mismatches the preset value, the damage detector may determine that the physical damage (e.g., micro crack) exists in the test object 130. In one embodiment, the comparison value may be set by a designer or a user.

Hereinafter, a process in which the Equation 1 is derived will be described with reference to FIG. 2.

Figure 2:
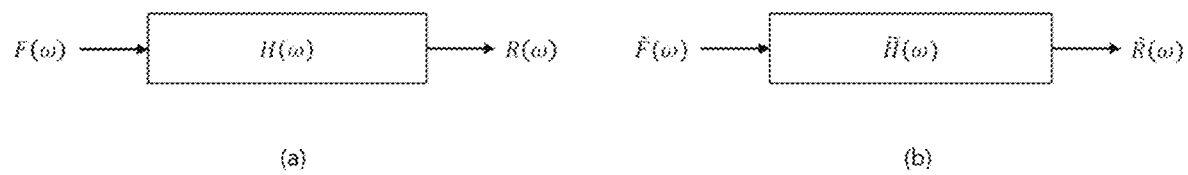
FIG. 2a-2b is a diagram illustrating a frequency response function.

FIG. 2 is a diagram illustrating a frequency response function.

When calculating the frequency response function using the frequency domain signal associated with the input signal of the test object and the frequency domain signal associated with the output signal thereof, the object damage inspection system may inspect the physical damage presence or absence of the test object, for example, the presence or absence of the micro crack, using the frequency response function.

Referring to FIG. 2, (a) in FIG. 2 shows a relationship between the input signal and the output signal and the frequency response function when a vibration exciting signal is input to an object (reference object) free of physical damage and thus the input signal and the output signal are measured. It is assumed that the same input signal is applied to the object (reference object) that has no physical damage and the object (test object) that has physical damage.

The frequency response function H(w) for the object (reference object) free of physical damage may be expressed as a following Equation 3:

$$H(\omega) = R(\omega)/F(\omega) \quad \text{[Equation 3]}$$

where F(w) represents a frequency domain converted signal corresponding to the input signal, R(w) represents the frequency domain converted signal corresponding to the output signal, and w represents an angular velocity.

When the object has physical damage, for example, when a crack exists in the object, dynamic characteristics of the object change, thereby to cause a change in the output signal relative to the input signal.

(b) in FIG. 2 is a diagram showing a relationship between the input signal and the output signal and the frequency response function when a vibration exciting signal is input to the object (test object) with physical damage and thus the input signal and the output signal are measured. The frequency response function for the object (test object) with physical damage may be expressed as a following Equation:

$$\overline{H}(\omega) = \overline{R}(\omega)/F(\omega) \quad \text{[Equation 4]}$$

where F(w) represents a frequency domain converted signal corresponding to the input signal, $\overline{R}(\omega)$, represents a frequency domain converted signal corresponding to the output signal, and w represents an angular velocity.

The coherence indicator I(w) between the frequency response functions of the above Equation 3 and Equation 4 may be expressed as a following Equation 5. The coherence indicator may be used to calculate similarity between the frequency response function of the object (reference object) free of physical damage and the frequency response function of an object (test object) with physical damage.

$$I(\omega) = \frac{|G_{H(\omega)\overline{H}(\omega)}|^2}{G_{H(\omega)H(\omega)} G_{\overline{H}(\omega)\overline{H}(\omega)}} \quad \text{[Equation 5]}$$

where I (w) represents the coherence indicator, w represents an angular frequency=$2\pi f$, $G_{H(\omega)H(\omega)}$ represents an auto correlation value of the frequency response function of the object (reference object) free of physical damage, $G_{\overline{H}(\omega)\overline{H}(\omega)}$ represents an auto correlation value of the frequency response function of the object (test object) having physical damage, and $G_{H(\omega)\overline{H}(\omega)}$ represents a cross correlation value between an auto correlation value of the frequency response function of the object (reference object) free of physical damage and an auto correlation value of the frequency response function of the object (test object) having physical damage.

When the above Equation 3 and Equation 4 are applied to the above Equation 5, a following Equation 6 may be derived.

[Equation 6]
$$I(\omega) = \frac{|G_{[R(\omega)/F(\omega)][\overline{R}(\omega)/F(\omega)]}|^2}{G_{[R(\omega)/F(\omega)][R(\omega)/F(\omega)]} G_{[\overline{R}(\omega)/F(\omega)][\overline{R}(\omega)/F(\omega)]}} \approx \frac{|G_{R(\omega)\overline{R}(\omega)}|^2}{G_{R(\omega)R(\omega)} G_{\overline{R}(\omega)\overline{R}(\omega)}}$$

Assuming that the same input signal is applied, it may be confirmed based on the Equation 6 that the coherence indicator may be calculated only using the output signal.

Referring back to FIG. 1, in one embodiment, the coherence calculator calculates a coherence indicator corresponding to a signal measured at each of n sensors using each of n test object measurement frequency signals as calculated based on each of n signals measured by each of the n sensors, and a reference object measurement frequency signal.

For example, the coherence calculator calculates a first coherence indicator corresponding to a signal measured by a first sensor 140*a* using a test object measurement frequency signal as calculated based on the signal measured by the first sensor 140*a* and a reference object measurement frequency signal, and calculates a second coherence indicator corresponding to a signal measured by a second sensor 140*b* using a test object measurement frequency signal calculated based on the signal measured by the second sensor 140*b* and a reference object measurement frequency signal, and calculates a third coherence indicator corresponding to a signal measured by a n-th sensor 140*n* using a test object measurement frequency signal as calculated based on the signal measured by the n-th sensor 140*n* and a reference object measurement frequency signal.

The damage detector may detect the physical damage presence or absence and the damage location of the test object 130 based on a comparison result between each coherence indicator value corresponding to each signal measured by each sensor and a preset value. For example, when the coherence indicator value corresponding to the signal measured by the second sensor 140*b* mismatches the preset value, the damage detector may determine that physical damage, for example, micro-crack is present on a surface where the second sensor 140*b* is located among various surfaces of the test object 130.

Figure 3:
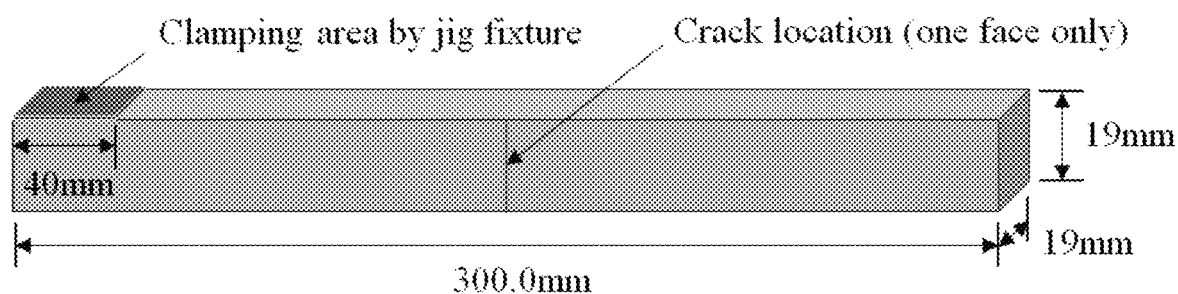
FIG. 3 shows an example of a test object.
Figure 4:
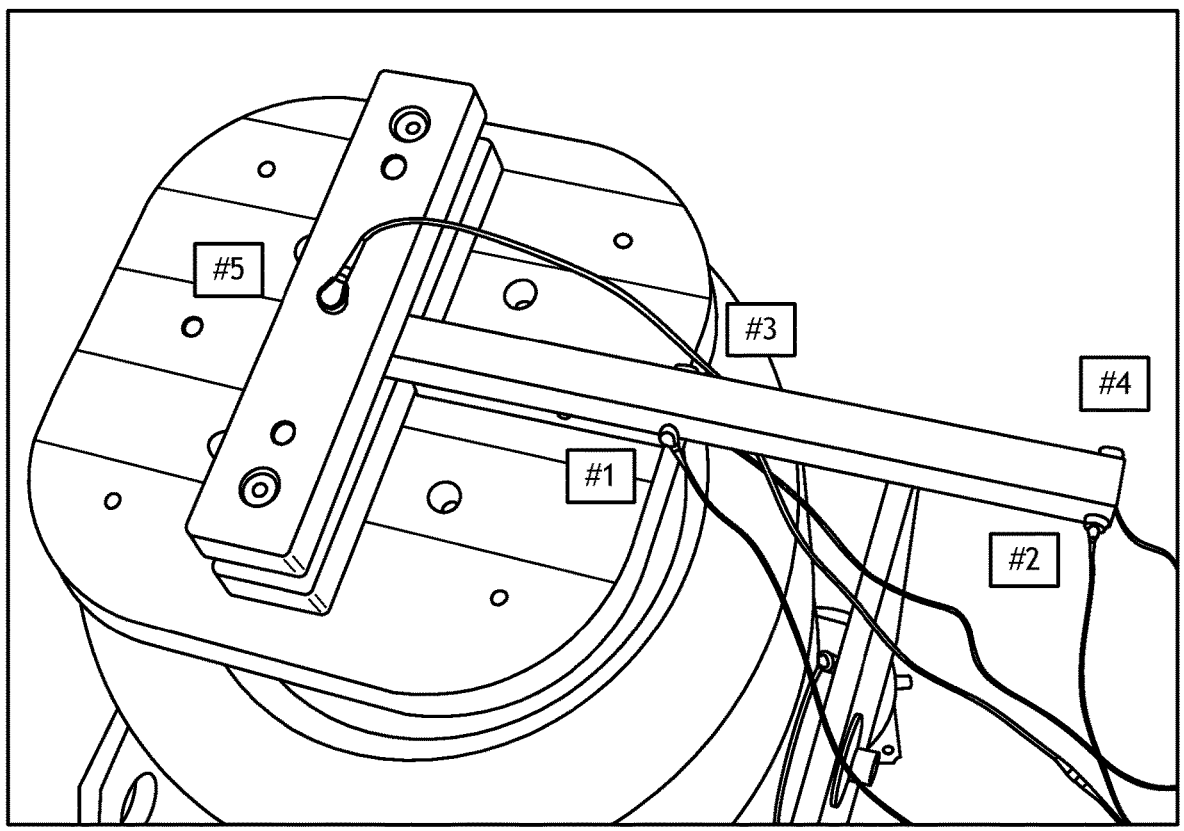
FIG. 4 is a diagram showing an experimental example of testing a test object using an object damage inspection system.

FIG. 3 is a diagram showing an example of a test object. FIG. 4 is a diagram showing an experimental example of testing a test object in FIG. 3 using an object damage inspection system.

FIG. 3 is a side view of a test object designed for the experiment. A left end thereof is fixed by the fixture 120. An artificially created microcrack is located in a center of one face of the test object.

FIG. 4 is a diagram showing an example of actually producing and testing the test object in FIG. 3.

Referring to FIG. 4, the test object 130 is located on the vibration exciter 110 while the object 130 is fixed to the fixture 120. It may be confirmed that a plurality of sensors 140 are located on the test object 130. The micro-crack is located in a center of a right portion of the test object 130. A first sensor #1 is located in a center of a right portion of the test object 130, a second sensor #2 is located in a right end of the test object 130, a third sensor #3 is located in a center of a left portion of the test object 130, a fourth sensor #4 is located in a left end of the test object 130, and a fifth sensor #5 is located on the fixture 120.

That is, the first sensor #1 and the second sensor #2 are located on a face where the micro-crack is located, while the third sensor #3 and the fourth sensor #4 are located on a face free of a micro-crack. The first sensor #1 and the third sensor #3 are located close to the micro crack, while the second sensor #2 and the fourth sensor #4 are located away from the micro-crack. The first sensor #1 and the second sensor #2 are located in positions where a sensing result is affected by the crack in a relatively greater degree, while the third sensor #3 and the fourth sensor #4 are located in positions where a sensing result is affected by the crack in a relatively smaller degree.

Figure 5:
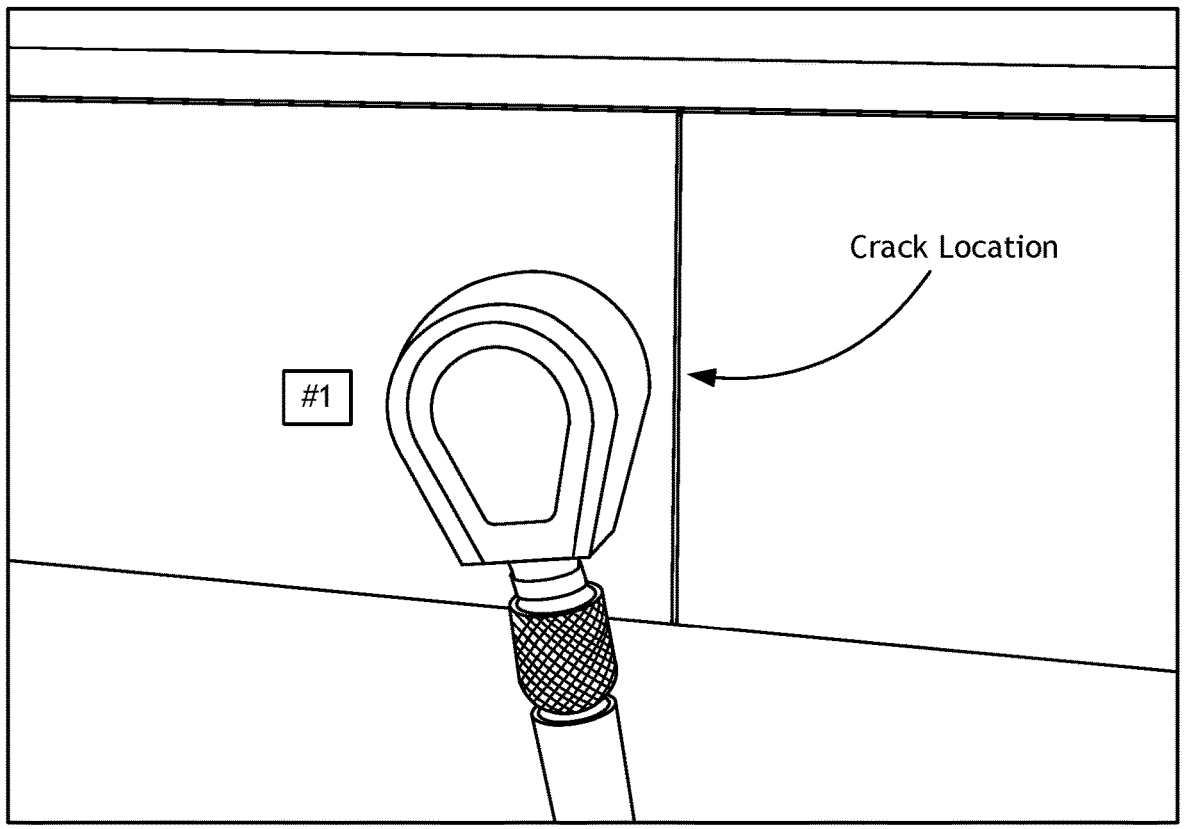
FIG. 5 shows an example of a sensor installed on a test object

FIG. 5 is a diagram showing an example of a sensor installed on test object and showing that the first sensor #1 is installed closer to the micro-crack and on a face where the micro-crack is present.

Hereinafter, there are set forth results of measuring a vibration signal (output signal) using each of the sensors #1, #2, #3, and #4 when applying a vibration exciting signal (input signal) is applied to the test object 130 using an impact vibration exciter under a condition shown in FIG. 4.

FIG. 6 is a diagram showing a frequency component of the input signal input to the test object.

FIG. 6 shows a frequency domain signal into which a vibration exciting signal input to the test object 130 is converted, when inputting the vibration exciting signal to the test object 130 via the vibration exciter 110. Referring to FIG. 6, it may be seen that frequency components of four vibration exciting signals #1, #2, #3, and #4 measured in the test object 130 are substantially similar to each other.

FIG. 7 shows a coherence indicator value calculated using a frequency response function for a test object.

FIG. 7 indicates results of calculating a coherence indicator value using the above Equation 5. In this connection, the vibration exciting signal (input signal) is applied to the test object 130 and then a vibration signal (output signal) is measured by each of the first sensor #1, the second sensor #2, the third sensor #3, and the fourth sensor #4. Then, each measured output signal is used to calculate each frequency response function H(w) corresponding to each sensor. Referring to FIG. 7, it may be seen that coherence indicator values corresponding to the first sensor #1 and the second sensor #2 located in positions where a sensing result is affected by the crack in a relatively greater degree respond in a very sensitive manner in a region of 1,100 Hz or greater.

FIG. 8 is a diagram showing a coherence indicator value calculated using a test object measurement frequency signal for a test object.

FIG. 8 shows results of calculating a coherence indicator value using the Equation 1. In this connection, a coherence indicator value is calculated based on each test object measurement frequency signal R̃(ω) as calculated using each vibration signal (output signal) measured by each of the first sensor #1, the second sensor #2, the third sensor #3, and the fourth sensor #4, and a reference object measurement frequency signal R(w) as previously calculated. Referring to FIG. 8, it may be seen that as shown in FIG. 7, coherence indicator values corresponding to the first sensor #1 and the second sensor #2 located in positions where a sensing result is affected by the crack in a relatively greater degree respond in a very sensitive manner in a region of 1,100 Hz or greater.

The damage detector may detect the physical damage presence or absence of the test object 130 (e.g., presence or absence of the micro crack) and the location of the damage based on a comparing result between the calculated coherence indicator value as shown in FIG. 8 and a preset value. For example, when, as shown in FIG. 8, the coherence indicator values of the first sensor #1 and the second sensor #2 are below the preset value, the damage detector may determine that there is physical damage (e.g., micro crack) on a face where the first sensor #1 is located and a face where the second sensor #2 is located.

FIG. 9 is a flowchart illustrating an object damage method according to an embodiment of the present disclosure.

Referring to FIG. 9, the vibration exciter 110 exerts a physical force in a predetermined pattern onto one face of the test object 130 under control (S910). The test object 130 may be fixed to the vibration exciter 110 via the fixture 120.

The sensor 140 collects the vibration signal generated from the test object 130 to which the vibration exciting signal has been input (S920). In one embodiment, the sensor 140 includes an acceleration sensor that measures acceleration vibration. In one embodiment, the sensor 140 includes a plurality of sensors. The plurality of sensors may be arranged at a plurality of positions of the test object 130 respectively and may be spaced apart from each other.

The coherence calculator of the damage determiner 150 calculates a coherence value between a test object measurement frequency signal into as a frequency domain signal into which a vibration signal collected by the sensor 140 is converted, and a reference object measurement frequency signal as previously calculated (S930).

In one embodiment, the coherence calculator calculates the coherence indicator value of the test object 130 using an auto correlation value of the test object measurement frequency signal, an auto correlation value of the reference object measurement frequency signal, and a cross correlation value between the test object measurement frequency signal and the reference object measurement frequency signal.

In one embodiment, the coherence calculator may calculate the coherence indicator value based on the following Equation 1:

$$I(\omega) = \frac{|G_{R(\omega)\tilde{R}(\omega)}|^2}{G_{R(\omega)R(\omega)} G_{\tilde{R}(\omega)\tilde{R}(\omega)}} \quad \text{[Equation 1]}$$

where I(w) represents a coherence indicator, w represents an angular frequency=2πf, $G_{R(\omega)R(\omega)}$ represents an auto correlation value of a reference object measurement frequency signal, $G_{\tilde{R}(\omega)\tilde{R}(\omega)}$ represents an auto correlation value of a test object measurement frequency signal, $G_{R(\omega)\tilde{R}(\omega)}$ represents a cross correlation value between a test object measurement frequency signal and a reference object measurement frequency signal, R(w) represent a reference object measurement frequency signal, and R̃(ω) represents a test object measurement frequency signal.

In one embodiment, the coherence calculator calculates a coherence indicator corresponding to a signal measured at each of n sensors using each of n test object measurement frequency signals as calculated based on each of n signals measured by each of the n sensors, and a reference object measurement frequency signal.

The damage detector of the damage determiner 150 detects the physical damage presence or absence of the test object 130 based on the calculated coherence value (S940). In one embodiment, the damage detector may detect the physical damage presence or absence of the test object 130 based on a comparing result between the calculated coherence indicator value and a preset value.

When coherence indicators corresponding to signals as measured by multiple sensors are calculated, the damage detector may detect the physical damage presence or absence and the damage location of the test object 130 based on a comparing result between each of the coherence indicator values corresponding to each of the signals measured by each of the sensors and the preset value.

The object damage inspection system and the inspection method as described referring to FIG. 1 to FIG. 9 may be implemented using an application or a module composed of computer executable instructions as executed by a computer. A computer-readable medium may store therein the computer executable instructions.

The computer-readable media may be any available media that may be accessed by a computer, and may include both volatile and nonvolatile media, and both removable and non-removable media. Further, the computer readable media may include computer storage media and communication media. The computer storage media may include all of volatile and nonvolatile, and removable and non-removable media implemented in any method or scheme for storage of information such as computer readable instructions, data structures, modules or other data. The communication media may typically include computer readable instructions, data structures, program modules, or other data such as a modulated data signal such as a carrier wave, or other transmission mechanism, and may include any information transmission medium.

The module may refer to hardware capable of performing functions and operations as illustrated in the present disclosure and may mean computer program codes that may perform certain functions and operations. Further, the module may mean an electronic recording medium, for example, a processor, on which computer program codes capable of performing specific functions and operations are mounted.

The embodiments of the present disclosure have been described above but a technical spirit of the present disclosure is not limited to the embodiments. Various sensitivity analyzing systems using a frequency response and various sensitivity analyzing methods using the same may be implemented within the scope of the present disclosure.

What is claimed is:

1. An object damage inspection system comprising:
   a fixture to fix a test object;
   a vibration exciter for setting a vibration exciting pattern and applying a physical force to one face of the fixed test object based on the set vibration exciting pattern;
   a sensor contacting a portion of the fixed test object, wherein the sensor collects a vibration signal generated from the fixed test object when the physical force is applied thereto; and
   a damage determiner configured to determine whether the fixed test object has physical damage, based on a test object measurement frequency signal and a reference object measurement frequency signal, wherein the test object measurement frequency signal includes a frequency domain signal into which the vibration signal collected by the sensor is converted, wherein the reference object measurement frequency signal is associated with a reference object free of physical damage and is previously calculated,
   wherein the damage determiner includes:
      a coherence calculator for calculating a coherence indicator value between the test object measurement frequency signal and the reference object measurement frequency signal; and
      a damage detector for detecting presence or absence of the physical damage of the fixed test object based on the calculated coherence indicator value, and
   wherein the coherence calculator is configured to calculate the coherence indicator value based on the following Equation 1:

$$I(\omega) = \frac{|G_{R(\omega)\tilde{R}(\omega)}|^2}{G_{R(\omega)R(\omega)} G_{\tilde{R}(\omega)\tilde{R}(\omega)}} \quad \text{[Equation 1]}$$

where I(w) represents a coherence indicator, w represents an angular frequency=$2\pi f$, $G_{R(\omega)R(\omega)}$ represents an auto correlation value of the reference object measurement frequency signal, $G_{\tilde{R}(\omega)\tilde{R}(\omega)}$ represents an auto correlation value of the test object measurement frequency signal, $G_{R(\omega)\tilde{R}(\omega)}$ represents a cross correlation value between the test object measurement frequency signal and the reference object measurement frequency signal, R(w) represent the reference object measurement frequency signal, and $\tilde{R}(\omega)$ represents the test object measurement frequency signal;
   wherein the damage detector is configured to compare the calculated coherence indicator value with a preset value and to detect the presence or absence of the physical damage of the fixed test object based on the comparison result.

2. The system of claim 1, wherein the fixture includes a fixing jig, wherein the fixing jig fixes one end of the test object.

3. The system of claim 1, wherein the sensor includes an acceleration sensor to measure acceleration vibration.

4. The system of claim 1, wherein the sensor includes a plurality of sensors, wherein the plurality of sensors are spaced apart from each other and are arranged at a plurality of locations of the fixed test object respectively.

5. The system of claim 4, wherein each of the sensors is disposed at each of the faces of the fixed test object.

6. The system of claim 4, wherein the coherence calculator is configured to calculate each of the coherence indicator values corresponding to each of the signals measured by each of the sensors.

7. The system of claim 6, wherein the damage detector is configured to compare each of the coherence indicator values corresponding to each signal measured by each sensor with a preset value, and to detect the presence or absence of the physical damage and a damage occurrence position of the fixed test object, based on the comparison result.

8. An object damage inspection method utilizing the system of claim 1 comprising:
   fixing a test object using a fixture;
   setting, by a vibration exciter, a vibration exciting pattern;
   applying, by the vibration exciter, a physical force to one face of the fixed test object based on the set vibration exciting pattern;
   collecting, by a sensor, a vibration signal generated from the fixed test object when the physical force is applied thereto;
   calculating, by a coherence calculator, a coherence indicator value between a test object measurement frequency signal and a reference object measurement frequency signal, wherein the test object measurement frequency signal includes a frequency domain signal into which the vibration signal collected by the sensor is converted, wherein the reference object measurement frequency signal is associated with a reference object free of physical damage and is previously calculated; and
   detecting, by a damage detector, presence or absence of the physical damage of the fixed test object based on the calculated coherence indicator value,
   wherein calculating the coherence indicator value includes calculating the coherence indicator value based on the following Equation 1:

$$I(\omega) = \frac{|G_{R(\omega)\tilde{R}(\omega)}|^2}{G_{R(\omega)R(\omega)} G_{\tilde{R}(\omega)\tilde{R}(\omega)}} \quad \text{[Equation 1]}$$

where I(w) represents a coherence indicator, w represents an angular frequency=$2\pi f$, $G_{R(\omega)R(\omega)}$ represents an auto correlation value of the reference object measurement frequency signal, $G_{\tilde{R}(\omega)\tilde{R}(\omega)}$ represents an auto correlation value of the test object measurement frequency signal, $G_{R(\omega)\tilde{R}(\omega)}$ represents a cross correlation value between the test object measurement frequency signal and the reference object measurement frequency signal, R(w) represent the reference object measurement frequency signal, and $\tilde{R}(\omega)$ represents the test object measurement frequency signal.

9. The method of claim 8, wherein detecting the presence or absence of the physical damage includes comparing the calculated coherence indicator value with a preset value, and detecting the presence or absence of the physical damage of the fixed test object based on the comparison result.

10. The method of claim 8, wherein calculating the coherence indicator value includes calculating each coherence indicator corresponding to each of n signals measured by each of n sensors, based on each of n test object measurement frequency signals as calculated based on each of the n signals, and the reference object measurement frequency signal.

11. The method of claim 10, wherein detecting the presence or absence of the physical damage includes comparing each coherence indicator value corresponding to each signal measured by each sensor with a preset value, and detecting the presence or absence of the physical damage and a damage occurrence position of the fixed test object, based on the comparison result.

12. The system of claim 1, wherein Equation I is derived from the following Equation 6:

[Equation 6]

$$I(\omega) = \frac{\left|G_{[R(\omega)/F(\omega)][\tilde{R}(\omega)/F(\omega)]}\right|^2}{G_{[R(\omega)/F(\omega)][R(\omega)/F(\omega)]} G_{[\tilde{R}(\omega)/F(\omega)][\tilde{R}(\omega)/F(\omega)]}} \approx \frac{\left|G_{R(\omega)\tilde{R}(\omega)}\right|^2}{G_{R(\omega)R(\omega)} G_{\tilde{R}(\omega)\tilde{R}(\omega)}},$$

where F(w) represents a frequency domain converted signal corresponding to an input signal of the vibration exciter.

13. The method of claim 8, wherein Equation I is derived from the following Equation 6:

[Equation 6]

$$I(\omega) = \frac{\left|G_{[R(\omega)/F(\omega)][\tilde{R}(\omega)/F(\omega)]}\right|^2}{G_{[R(\omega)/F(\omega)][R(\omega)/F(\omega)]} G_{[\tilde{R}(\omega)/F(\omega)][\tilde{R}(\omega)/F(\omega)]}} \approx \frac{\left|G_{R(\omega)\tilde{R}(\omega)}\right|^2}{G_{R(\omega)R(\omega)} G_{\tilde{R}(\omega)\tilde{R}(\omega)}},$$

where F(w) represents a frequency domain converted signal corresponding to an input signal of the vibration exciter.

* * * * *